Patented Oct. 6, 1936

2,056,460

UNITED STATES PATENT OFFICE 2,056,460

POTENTIAL RESINS AND PROCESS OF MAKING THE SAME

Arthur M. Howald, Toledo, Ohio, assignor, by mesne assignments, to Plaskon Company, Incorporated, a corporation of Delaware No Drawing. Application April 16, 1934, Serial No. 720,912

6 Claims. (Cl. 260—3)

This invention relates to potential resins and processes of making the same; and it comprises a thin and mobile aqueous solution of the reaction products of formaldehyde and urea in molecular proportions around 1.5:1 and various solid products made from this solution, these products being non-resinous but capable of resinifying under heat and pressure and ranging from a crop of wet crystals through the same crystals dried and the dry crystals heated to cause certain internal changes; and it further comprises a method of making said solution and said products wherein commercial, somewhat acid formaldehyde solution is neutralized to give an acidity between pH 4 and pH 6.5, urea is dissolved in the liquid, the amount of urea for a 1.3:1 ratio being about 4 parts by weight for 2.6 parts by weight of actual formaldehyde, and the solution is allowed to undergo reaction at a temperature not above 80° F. until it solidifies to a mass of wet crystals, these crystals are then dried in an air current at a temperature around 120° F. until dryness is attained; the dried mass is then treated, if necessary, to establish a pH around 5, the somewhat acid mass is then heated and stirred at about 230° F. until reaction takes place attended by evolution of water vapor, and the mass is then cooled, pulverized and dried at 140° F.; an addition of 0.1 per cent of benzoyl peroxid and 0.5 per cent of zinc stearate being sometimes made to facilitate production of hot molded articles; all as more fully hereinafter set forth and as claimed.

It has long been known that urea reacts vigorously with formaldehyde and that infusible hard resinous products can be obtained thereby. To make molded articles from such reaction products has been the object of innumerable processes proposed in the art.

A granular insoluble, infusible product, known as Goldschmidt's compound and containing formaldehyde and urea combined in a molar ratio of 1.5:1 is obtained when urea is reacted with commercial aqueous formaldehyde (the acid solution of formaldehyde known as formalin which has a pH of about 3). The reaction is exothermic and vigorous, being so to speak, self-accelerating. Heat and acidity accelerate the formation of the granular infusible product. With acidities equal to that of formalin (pH 3) or greater, Goldschmidt's compound is almost immediately formed as a granular precipitate. With the higher acidities the heat developed by the reaction is great and may bring the solution to a boil.

Goldschmidt's compound itself has no commercial utility although it has many properties desirable in a shaped molded article. The problem in the art has been to obtain Goldschmidt's compound in shaped, continuous form. Goldschmidt's compound being both insoluble and infusible there has been no means available whereby it could be shaped into commercial molded articles.

Various makeshifts have been proposed to prevent the formation or precipitation of Goldschmidt's compound when urea and formaldehyde are reacted together and to obtain various materials capable of being shaped. However, the makeshifts in question have interfered with the hardening of the shaped material to convert it into bodies having properties comparable with those of Goldschmidt's compounds. That is, the shaped articles obtained have not had the necessary stability and other properties required in commercial molded articles.

In the manufacture of molded articles from urea and formaldehyde there are two fundamental methods each radically different from the other. One is the casting method using a liquid product and the other is the hot pressing method, using solid materials. Materials adaptable to one method are unsuited for the other.

In the casting method, a viscous aqueous syrup of urea-formaldehyde products, capable of gelling or of being gelled, is first prepared, the viscous liquid syrup poured into a mold and gelled therein and then the cast product baked to remove excess formaldehyde, water, etc., and to harden it. Such casting processes have been more or less abandoned because of inherent defects and their inability to produce stable molded articles.

In the hot pressing method, a solid urea-formaldehyde product is first produced and this is then shaped and hardened under heat and pressure in a suitable mold. For successful operation the properties of the molding composition must be properly correlated with the fundamental steps of the hot pressing procedure. This has seldom been done; the properties have not been correlated with the requirements of closed mold operation. It has consequently been difficult to consistently produce sound, stable, hot pressed articles.

The urea resins which were sufficiently fusible to be properly shaped, liberate volatiles during molding or do not properly harden or both. Consequently the shaped articles were neither sound nor stable. On the other hand, the urea resins sufficiently free of volatiles or incapable of liberating volatiles at molding temperature, lack the thermoplasticity necessary for quick and proper shaping under commercial press conditions.

They were prematurely hardened and the details of the mold were not reproduced. All in all it has been difficult to produce commercially satisfactory hot molded articles from urea-formaldehyde resins in ordinary closed mold operation.

The present invention, like certain of my prior inventions is directed to hot pressing methods of molding urea-formaldehyde products, to molding compositions adaptable thereto and to the preparation of such molding compositions. In the present invention a potential resin rather than a resin per se is produced. This potential resin is converted into the insoluble, infusible resin in the hot pressing procedure after it has been shaped. Thus there are obtained sound, stable shaped articles having properties similar to Goldschmidt's compound. One novel feature of the present processes is the formation of a crystal magma of urea-formaldehyde reaction products which can be easily produced and converted into the potential resin.

The new potential resin is a solid material free of volatiles, either actual or potential, thermoplastic and heat-convertible into a stable, hard, water-resistant, insoluble, infusible product without substantial alteration in the ratio of combined urea and formaldehyde.

I have certain prior and copending applications disclosing processes of making dry urea-formaldehyde compositions, useful in and adaptable to the manufacture of molded articles by hot pressing methods. In several of those applications I describe methods of making potential resins and molding compositions containing them, wherein urea is reacted with formaldehyde in aqueous solution under controlled and correlated conditions, the potential resin being recovered as a dry, fusible, heat-hardening body capable of being hot pressed without liberation of volatiles. In those applications, the advantages of effecting the reaction in the cold, of using a molar ratio of formaldehyde to urea not greater than 1.55:1 and of drying at low temperatures, with slightly acid conditions prevailing from beginning to end, have been described. In the present improved process in addition to those advantages, other advantages are obtained by a further correlation and adjustment in the conditions and procedures employed. The present invention is an improvement upon and continuation of my prior inventions.

In Ser. No. 494,693, I describe and claim particular methods wherein the features mentioned ante are applied to the production of molding powders containing fibrous filler, the solution of urea-formaldehyde reaction products being taken up in paper pulp or the like, prior to the drying step; sufficient paper pulp being used to obtain a moist mass which is easily dried and dehydrated at low temperatures. In those methods, the solution of urea-formaldehyde reaction products is taken up in the filler before the solution shows any gumminess or development of crystals. At that time most of the formaldehyde has become fixedly combined with the urea, but the remainder of it is loosely combined or free, being detectable by test with sodium sulfite. During the drying of the moist mass of impregnated filler, most of this loosely combined formaldehyde becomes fixed, although a small amount is lost by evaporation.

In Ser. No. 597,425 which is a continuation in part of Ser. No. 494,693, I describe and claim the production of a potential resin by a similar process wherein the said solution of urea-formaldehyde reaction products is dried without the aid of fibrous filler, there being obtained a molding composition adaptable to hot pressing which is free of filler and capable of producing transparent or translucent shaped, hard, infusible molded products. In this process, the initial ratio of formaldehyde to urea may be varied to compensate for the formaldehyde lost by evaporation during the drying of the reaction products. No absorbent filler being present, the drying conditions are somewhat different than in Ser. No. 494,693.

The present invention differs from the specific methods of Ser. No. 494,693 and 597,425 in that the initial reaction is continued for a longer time before the drying is started. In the present processes it is continued until the solution sets to a crystal magma, whereas in my prior processes the drying is started before any crystals appear. By this advantageous modification, a greater ratio of formaldehyde becomes fixedly combined with the urea before drying and dehydration are instigated, thus there is less loosely combined or free formaldehyde to be fixed during the drying or dissipated with the water by evaporation. By the present procedure greater utilization of the formaldehyde can be obtained. The loss thereof during drying is less than when the drying of the solution of urea-formaldehyde products is started at an earlier stage as in Ser. No. 597,425, wherein the then mobile solution is sprayed or drum-dried.

Another advantage of continuing the initial reaction until a crystal magma is formed, is that the drying to remove free water can be, so to speak, segregated from the drying and dehydration by which combined water is removed. This segregation is obtained in the present processes by first drying the wet crystal magma in a current of air to remove the free water and obtain thoroughly dry crystals and then treating the so-dried crystals to convert them into a potential resin; the combined water being eliminated during this conversion. In my prior processes, the simple drying and dehydration, together with the said conversion into a potential resin, were more or less simultaneously effected in a single drying operation. By the present modified method, most of the loosely combined formaldehyde becomes fixed during the simple drying; fixed prior to the time the said conversion and elimination of combined water is effected. This results in the production of potential resins of somewhat better quality as well as giving a more effective utilization of the amount of formaldehyde employed.

As in the processes disclosed in Ser. Nos. 494,693 and 597,425, the temperature of reaction and the acidity of the reaction medium are correlated and restricted to prevent the formation of gummy solid bodies or the production of viscous syrups containing them. The development of gummy bodies and the formation of a viscous syrup indicates that the reaction is out of control and undesirable side reaction products have been formed. Any gummy or colloidally dispersed insoluble, infusible bodies in the said solutions are carried down into the dried product and interfere with and detract from the quality of the potential resins produced by my methods. High quality potential resins are obtained in the present methods as the formation of such undesirable side reaction products is avoided.

There are other differences in specific details of the present process over the specific methods disclosed in my prior copending application, apparent from the detailed description of the present invention given post. The modifications which constitute the present improvement over Ser. Nos. 494,693 and 597,425 are principally the continuation of the initial reaction for a longer time to produce a crystal magma of simple addition products of urea and formaldehyde and the treatment of this solid mass containing water in such a manner that the simple drying and the conversion into the said potential resins with the incident elimination of combined water, are more or less segregated to permit better adjustment of the essential factors and to obtain better quality products with greater economy.

In the present invention, as stated, formaldehyde and urea are utilized to produce what may be termed potential resins; materials which are not themselves resinous but which may be readily resinified; which are, so to speak, "intermediates" in resin making. The primary product is a certain thin and mobile aqueous solution which, when made from commercial 37 per cent formaldehyde solution and solid urea in a way hereinafter set forth, carries about 50 per cent water. It is less viscous than a cane sugar solution of similar concentration. It is freely miscible with alcohol, acetone and solvents of similar type, including alcoholic ethers such as the methyl ether of ethylene glycol.

In making this thin liquid primary product a number of conditions are to be observed. The ratio of actual formaldehyde ($COH_2$) to urea by weight may vary between 2.1:4 and 3.1:4 or in molecules between 1.55:1 and 1.05:1. Any substantial departure from this ratio range gives final hard resins deficient in stability. A range between 1.3:1 and 1.35:1 is the best range. There is a small variance possible; but not much. With proper operation there is not much loss of formaldehyde as gas; and it is often unnecessary to add any excess in the initial mix to take care of interim losses. Commercial formaldehyde solution and commercial urea are used, the latter being dissolved in the former. The mixture is usually filtered.

To secure smooth action, and a thin, mobile, stable unpolymerized primary product, the acidity of the formaldehyde solution should be limited not greater than about 4 pH. The limiting acidity is not exactly a fixed factor; but with acidities greater than 4 pH correlation of other conditions becomes complicated. Somewhere between 4 and 6 pH is the usual working range; the particular pH used depending on the specific results desired. As commercial formaldehyde is mostly more acid than this, it should be partially neutralized before use; sufficient base being added to give the slightly acid pH desired. Triethanolamin is a convenient base; but in the small amount required soda, potash, lime can be used. The addition should not be sufficient to make the liquid neutral or alkaline. The reactions taking place in alkaline media are different from those occurring in the presence of free acid; and it is the acid-medium type of reaction which is here wanted. The idea in the present invention is to use acid as a catalyst but not use enough or temperatures high enough to cause violent actions. With any acidity more than corresponds to 5 pH, artificial cooling is necessary in the first stages of action. With 5 pH to 6.5 pH the actions are regular and in the desired direction.

The temperature is an important factor; and particularly in the first stages where the two reactants have their maximum concentration; its importance increasing with the acidity. On dissolving urea in formaldehyde the first action is a physical cooling which, in big batches, may take the temperature down to 0° C. It is then better to warm to 20-25° C. and it is convenient to keep the reaction mixture within that range until the primary product is ready for use; a period which with 5 pH is generally 4 to 5 hours while with 6.5 pH from 10 to 15 hours may be required. Generally I do not operate at any time at a temperature above 30° although with the limited acidity used the objection to higher temperatures is mostly that action goes on too fast for convenience. In a general way, 10 minutes action at 100° C. may carry the reaction as far as 8 hours or so at 25° C. with a 6.5 pH.

A white water-soluble non-resinous solid material can be recovered from this primary product by drying or evaporation. Drying is however easiest when the liquid is first taken up on a fibrous filler thereby securing extensive evaporating surfaces; an expedient used in making molding powders. The solid material is probably a complex mixture of substances. It has no definite melting point though it becomes temporarily fluent or pasty when heated. The point at which this fluent condition or semi-fusion occurs may be anywhere between 50° and 80° or 100° C.; it depends on the speed of heating, the amount of polymerization in desiccation, the presence or absence of traces of moisture, the pH value, etc. The pH value is particularly important, it being easiest to desiccate at a pH of about 5 to 6. Greater acidity at the time of drying causes internal changes in the direction of resinification. With dried material the fusion temperature is often between 70 and 80° C., although no definite fusion to thin liquid occurs in well dried material.

While this dry material is valuable, I have found that I can make a better material in another way; a material more definite in its properties. As noted, the properties of directly dried material depend largely on the pH and the drying conditions. With proper drying the material, however, is always soluble in water, alcohol and acetone and alcoholic solvents of a similar nature. It is, however, variable.

In making a dry material of more definite quality, I vary the procedure before indicated by not directly drying the liquid primary product. Instead I allow it to stand in the cold at an acidity around 6 pH until it solidifies to a wet mass of crystals. The temperature should not go above 25° C. The time required for this result is of the order of 72 hours. This wet crystal magma can be readily dried at low temperature giving a definite material. A low temperature is required in drying since the wet crystals are apt to melt. A clear melt results at 70° C. Drying is advantageously at about 45° to 50° C. in an air current and may require as long as 48 hours; this, of course, depending on the mass and the apparatus. A white dry powder is obtained easily fusible and soluble in water, ethyl alcohol, acetone and, generally speaking, in the ordinary volatile solvents of this type; in alcohols and ketones. On heating this dry powder readily fuses and loses solubility after longer heating, but it does not readily resinify unless the pH be made more acid. However, by agitating and heating the so dried material to approximately its fusion temperature and working in sufficient benzoic acid or another acid to increase the acidity thereof to about pH 5, say at a temperature of 110° C., a progressive stiffening of the heated acidified mass is obtained. This conversion of the dry material into dehydrated products having a higher fusion temperature is further illustrated by the specific embodiment given post. In such conversion, there are internal changes resulting in the formation of H₂O which escapes as vapor; the type of reaction known as condensation. The original weight of the dry crystals before this change is about the sum of the actual formaldehyde and urea used in making the primary liquid product. They represent an addition product. After this evolution of H₂O the weight is lessened to an amount corresponding to the formation of H₂O for each 3CH₂O and 2CO(NH₂). The stiffened material made at 110° C. and at a pH of 5, on cooling gives a solid product which can be readily pulverized and dried at low temperature. A temperature of 60° C. is ordinarily employed in drying. The powder can be molded at 140° C. with a mold pressure of 2000 pounds per square inch, giving a hard, transparent article. The stiffening treatment described enables molding without the use of fillers. Solid fillers can be admixed with the dry powder prior to molding. Mineral pigments may be employed. Blanc fixe is suitable in making porcelain-like articles. Whether a filler is used or not, it is found that the incorporation of about 0.1 per cent of benzoyl peroxid with the dry powder gives quicker molding. An addition of 0.5 of zinc stearate gives a preparation which molds more readily, the zinc stearate acting as a mold lubricant. Zinc stearate, however, gives opalescent, rather than transparent, molded articles.

With properly dried material, either with the directly dried original liquid primary product or that formed by permitting crystallization and then drying the crystals, heating results in the production of a hard, infusible, insoluble resin; the hardness progressively increasing to a glass-hard condition. The time required to complete this setting or curing to maximum hardness depends on the temperature and the pH value. In molding shaped articles pressure is useful mainly to obliterate voids and secure a continuum. The use of pressure or compression may be only temporary; hardening being secured by a subsequent baking at temperatures around 80°–100° C. Curing can be at higher temperatures, up to perhaps 135°–140° C., but they are not necessary. Short exposure to heat of the order of 160° C. does not damage the hardened resins. With articles submitted to sufficient compression in the fluent condition to obliterate pores and voids, it is often a convenient expedient to shape articles by pressure and to cure subsequently in a bath of hot boiling oil. A heavy lubricating oil serves. Setting to a glassy solid is due to internal rearrangement or polymerization, and is not attended with evolution of vapors or gases, so that closed molds are not required if the material is properly dried. Formaldehyde is not given off.

Properly hardened articles from properly made material are high grade; they stand immersion in boiling water for 30 minutes as an accelerated test. If no filler is present they are like glass in most properties with the additional advantage of machinability. Good lathe stock can be made by warming the dried material to a plastic temperature, compressing sufficiently to obliterate voids and then baking at 80° to 100° C. Beads, buttons, handles, etc., can be made from this stock on a lathe. Where transparency is not wanted, the lathe stock can contain a white or colored filler; wood flour for example. Turned articles do not smell of formaldehyde. Properly made and hardened resin is white and colorless unless dyed, is permanent in the air, does not take up moisture and is resistant to actinic light. It is transparent to the ultra-violet rays and, though this fact is useful in some relations, it renders care necessary in selecting resistant dyes for colored articles. Mineral pigments can be used.

The original thin and mobile liquid and the similar reconstituted liquid made by redissolving the dried material, advantageously that made by drying the crystallized product, have properties enabling their use in a wide variety of arts, varnishing, painting, water-proofing, wood and paper impregnating, etc. The liquid will carry large proportions of the clays and other finely divided mineral matters used in glazing paper, giving a mix capable of application by the usual brushing and spraying mechanisms used in making coated paper. The liquid is useful in making cold water paints; and the dried, fine ground material can be mixed with dry pigments to make a preparation forming a "cold water paint" on addition of water. In all these uses, as the water of the liquid evaporates, there is a formation of the dry product mentioned. In time, this will resinify and quick resinification can be induced by application of heat, as in passing coated or impregnated paper or fabric over hot rolls. In so doing the liquid first dries, the residue becomes fluent and plastic and is then converted into the glassy type of resin described. "Cellophane" may be water-proofed in this manner.

The primary liquid and the reconstituted liquid can be usefully employed in making molding powders, being taken up by wood flour and other filler and dried in place. They can also be used for impregnating thick paper and pulp board to be used in hot stamping processes. These particular uses, however, I do not herein claim, they forming the subject matter of prior and co-pending applications, Nos. 578,744 and 583,154.

As stated, in making the primary liquid reaction product to be taken up and dried on fiber in making a molding powder, the ratio 1.5:1 on the whole gives excellent products; high grade stable molded articles. Some formaldehyde is apt to escape and the ratio in the molded article is less than 1.5:1. But with the careful control of drying and other conditions given where the material is allowed to crystallize and the crystals then dried it is permissible, and in fact advantageous in many instances, to work with lower ratios. So it is sometimes desirable to vary from the stated 1.5:1 ratio, the range being perhaps between 1.05:1 and 1.55:1. Without careful control, ratios below 1.5:1 are apt to allow the formation of white opaque, insoluble, infusible bodies which go forward as so much ballast. But using the careful procedure in drying indicated ante these low ratios become useful and highly stable products can be obtained. High stability occurs with a final ratio of 1.3:1 to 1.35:1. It is possible to make transparent bodies with these low ratios, the cold reaction process and low temperature drying obviating the risk of forming opaque by-products.

Various alkyl and aryl substituted ureas may be used in lieu of ordinary urea, the reaction being controlled by limiting the acidity and the temperature, one or both, in the way specified. The products are good, but as the matter is at present regarded, products made with urea itself are more advantageous.

In the described operation it will be noted that there are three or four acidities that are important; these varying. In making up the primary liquid material I find it on the whole best to work with an acidity around 6 pH; but in drying the wet crystal magma to remove the free water, moisture, water of crystallization, etc., a somewhat greater acidity gives quicker and better results. In what may be called the dehydrating stage where $H_2O$ is formed and removed, the action goes forward best at about 5 pH. On the other hand, in molding after the material flows sufficiently to fill the void, there should be a sudden development of acidity with an equally sudden development of rigidity. At this time, a pH of about 4 is right; that is, the molded material when ground up and mixed with water should indicate this amount of acidity. To obtain this final sudden creation of acidity I customarily use benzoyl peroxid. Other "masked" acids such as beta-brom-hydrocinnamic acid may be employed. These materials pyrolyze at definite temperatures about 100° C. to give acid bodies.

In a specific embodiment of the described invention, 1000 pounds of actual formaldehyde $CH_2O$ in solution as commercial 37 per cent material was taken. The liquid was neutralized to pH 6.4 using brom-thymol blue and triethanolamine. In this solution was dissolved 1547 pounds of commercial fertilizer urea, the actual amount of $CO(NH_2)$ used being 1500 pounds. This was a weight ratio of actual formaldehyde to actual urea of 1:1.5 or a molecular ratio of approximately 1.33:1. The solution was turbid and contained bag hairs and it was sent through a filter press. In dissolving the urea in the formaldehyde a sharp chilling action occurred, dropping the temperature of the mixture to about 4° C. The liquid was warmed to 25° C. and allowed to stand for 72 hours at a temperature never above 25° C. During this time it was allowed to remain quiescent.

At the end of 72 hours the liquid had set to a crystal magma. This was broken up to form a loose mass of wet crystals. The wet crystals were placed on trays in a drier. Over the wet crystals was sent a slow current of warm air. The temperature of the crystal mass however was not allowed to go above 120° F. After about two days low temperature drying the weight of the mass had decreased to 2550 pounds. This is the original weight of the urea and formaldehyde plus about 2 per cent; this latter 2 per cent representing retained moisture.

The crystal mass after being so dried was a material soluble in alcohol, in the methyl ether of ethylene glycol and generally in solvents of this type. But it was insoluble in benzol, turpentine and linseed oil. At a temperature of 115° C. this dried material melted gradually, going into quiet fusion.

In this particular embodiment of this invention, the mass of dry crystals was placed in a steam heated agitator and brought to a temperature of 100° C. Into the molten mass was kneaded enough benzoic acid to bring the pH of a sample, redissolved in water, to 5. The mixer was placed in action and the material held at a temperature of 110° C. for a time. It rapidly stiffened and there was an evolution $H_2O$ vapor indicating internal changes of the nature of condensation. When mastication began to be difficult the mass was cooled, pulverized and dried at 140° F. The powder at this time had a softening point of 120° C. It was insoluble in alcohol, and alcoholic solvents generally. Into the fused mass pyroxylin or cellulose acetate could be incorporated.

In making transparent moldings from the second named material, that produced by heating at pH 5, it was mixed with 0.1 per cent benzoyl peroxid. The mixture on heating to 140° C. under a pressure of 3000 pounds formed a hard durable transparent article. Similar articles were made incorporating a filler with the powdered material prior to the hot pressing.

What I claim is:
1. As an improvement in the manufacture of potential resins for formaldehyde and urea, suitable for hot-pressing, the improvement which comprises dissolving urea in a slightly acid aqueous solution of formaldehyde having an acidity less than pH 5, in sufficient amount to give a molar ratio of formaldehyde to urea between 1.05:1 and 1.55:1, maintaining the mixture at temperatures not exceeding 30° C. until the urea is combined with the formaldehyde and the slightly acid solution of urea-formaldehyde reaction product solidifies to a crystal magma consisting of a slightly acid, wet mass of crystals, said crystal magma melting at approximately 70° C., disintegrating the crystal magma to form a loose mass of wet crystals, drying the disintegrated wet crystal mass at temperatures between 45 and 60° C. in a current of air, until a dried powder easily fusible at 115° C. and soluble in water, alcohols and the methyl ether of ethylene glycol is obtained, adding sufficient organic acid to the dried powder to give an acidity equivalent to approximately pH 5 and heating and agitating the mixture to temperatures between 100 and 110° C. until the mixture evolves $H_2O$ and is dehydrated, discontinuing the heating before an infusible material is obtained, pulverizing the potential resin thereby obtained and further drying at low temperature, said temperature not exceeding 60° C.

2. The process of claim 1 in which said ratio is 1.3:1 and the wet crystals are dried until their weight is not greater than 2 per cent above the sum of the urea and actual formaldehyde used.

3. The process of claim 1 wherein the wet crystals are dried until a powder soluble in ethyl alcohol is obtained and the said dehydration is continued until a product insoluble in alcohol is obtained.

4. In the manufacture of potential resins directly convertible into insoluble, infusible resins by hot pressing and having urea combined with formaldehyde in approximately the ratios desired in the final infusible resin, by reacting not more than 1.55 mols of formaldehyde with 1.00 mol. of urea in an aqueous slightly acid solution having an acidity less than that corresponding to pH 5 the reaction being effected at a temperature not exceeding 30° C., the improvement which comprises continuing said reaction under said conditions until a wet solidified crystal magma containing substantially all the formaldehyde combined with the urea is obtained, drying the wet slightly acid crystal magma so obtained at temperatures insufficient to resinify it until it contains not more than 2 per cent physical moisture, said drying being effected at temperatures not exceeding 60° C., converting the said dry material so obtained into a potential resin by adjusting its acidity to approximately pH 5 and heating and agitating the acid mass at temperatures between 100 and 110° C. until combined water is split off and a stiffened mass of higher softening point is obtained, the heating being stopped before a resinified difficultly fusible product is obtained, the combined water so split off being removed by a further drying at low temperatures to obtain a dry potential resin.

5. In the manufacture of potential resins adaptable to hot pressing procedures the steps which comprise adding sufficient acid to a dry, soluble, fusible urea-formaldehyde reaction product to form a dry mixture having an acidity of at least pH 5 but not greater than pH 4, said urea-formaldehyde reaction product being slightly acid with a pH between 6.5 and 5, containing not more than 2 per cent of uncombined volatiles, containing formaldehyde combined with urea in a molar ratio not greater than 1.55:1, the formaldehyde being fixedly combined with urea and being soluble in ethyl alcohol and the methyl ether of ethylene glycol and fusible at temperatures between 70 and 115° C., converting the so acidified dry urea-formaldehyde reaction product into a potential resin without substantially altering the said ratio of formaldehyde combined with urea, by heating and agitating the said dry mixture at temperatures between 100 and 110° C., combined water being split off during said conversion and the heating being stopped before resinous difficultly fusible products are obtained, and then drying the potential resin to remove the water thus formed in said conversion, prior to applying sufficient heat and pressure to resinify the potential resin and to form insoluble, infusible, resins, said subsequent drying being effected at low temperatures insufficient to resinify the slightly acid potential resin.

6. The process of claim 5 wherein the said dry product contains formaldehyde combined with urea in the molar ratios of between 1.3:1 and 1.35:1 and wherein said potential resin obtained by said conversion is cooled and pulverized and then dried at a temperature of approximately 140° F.

ARTHUR M. HOWALD.